United States Patent
He et al.

(10) Patent No.: US 11,093,521 B2
(45) Date of Patent: Aug. 17, 2021

(54) JUST-IN-TIME DATA QUALITY ASSESSMENT FOR BEST RECORD CREATION

(71) Applicants: Min He, Palo Alto, CA (US); Frank Le, Palo Alto, CA (US); Hiren Kotadia, Palo Alto, CA (US); Hemant Puranik, Palo Alto, CA (US); Abhiram Gujjewar, Palo Alto, CA (US); David Kung, Palo Alto, CA (US)

(72) Inventors: Min He, Palo Alto, CA (US); Frank Le, Palo Alto, CA (US); Hiren Kotadia, Palo Alto, CA (US); Hemant Puranik, Palo Alto, CA (US); Abhiram Gujjewar, Palo Alto, CA (US); David Kung, Palo Alto, CA (US)

(73) Assignee: SAP SE, Walldorf (DE)

( * ) Notice: Subject to any disclaimer, the term of this patent is extended or adjusted under 35 U.S.C. 154(b) by 712 days.

(21) Appl. No.: 13/929,475

(22) Filed: Jun. 27, 2013

(65) Prior Publication Data
US 2015/0006491 A1 Jan. 1, 2015

(51) Int. Cl.
*G06F 16/27* (2019.01)

(52) U.S. Cl.
CPC .................. *G06F 16/27* (2019.01)

(58) Field of Classification Search
CPC ......... G06F 17/30289; G06F 17/30082; G06F 17/30371; G06F 17/30221; G06F 17/30011
See application file for complete search history.

(56) References Cited

U.S. PATENT DOCUMENTS

| 7,289,974 | B2 | 10/2007 | Godeby et al. |
| 7,302,446 | B1 * | 11/2007 | Boothby ........... G06F 17/30581 707/610 |
| 7,865,507 | B2 | 1/2011 | Naimat et al. |
| 8,166,048 | B2 | 4/2012 | Wong et al. |
| 8,219,523 | B2 | 7/2012 | Harush |

(Continued)

OTHER PUBLICATIONS

SAP BusnessObjects, Master Guide, SAP BusinessObjects Data Services and SAP BusinessObjects Information Steward 4.1. Apr. 27, 2012.

*Primary Examiner* — Hosain T Alam
*Assistant Examiner* — Nicholas E Allen
(74) *Attorney, Agent, or Firm* — Fountainhead Law Group P.C.

(57) ABSTRACT

Systems and methods for just-in-time data quality assessment of best records created during data migration are disclosed. A data steward includes tools for creating and editing a best record creation strategy that defines how records from multiple systems will be integrated into target systems. At design time, the data steward can generate best record creation and validation rules based on the best record creation strategy. The data steward can apply the best record creation and validation rules to a sample of matched records from multiple data sources to generate a sample set of best records. The efficacy of the best record creation rules can be evaluated by assessing the number of fields in the sample set that fail the validation rules. During review, the validation rules can be applied to edits to the best records received from a human reviewer to ensure compliance with the best record creation strategy.

20 Claims, 8 Drawing Sheets

(56) References Cited

U.S. PATENT DOCUMENTS

| | | | |
|---|---|---|---|
| 8,341,131 B2 | 12/2012 | Cohen | |
| 8,364,692 B1* | 1/2013 | Allen et al. | 707/758 |
| 8,401,987 B2 | 3/2013 | Agrawal et al. | |
| 8,601,029 B2 | 12/2013 | Anand et al. | |
| 8,626,570 B2 | 1/2014 | Lee et al. | |
| 8,645,332 B1 | 2/2014 | Cohen et al. | |
| 8,676,962 B2 | 3/2014 | Yarter | |
| 8,694,561 B2 | 4/2014 | Peukert | |
| 8,719,311 B2 | 5/2014 | Blight et al. | |
| 2008/0249981 A1* | 10/2008 | Norring | G06F 17/30566 |
| 2011/0131253 A1 | 6/2011 | Peukert et al. | |
| 2011/0231454 A1* | 9/2011 | Mack | G06F 17/30569 |
| | | | 707/803 |
| 2012/0016899 A1* | 1/2012 | Kumar | G06F 17/30566 |
| | | | 707/769 |
| 2012/0072464 A1* | 3/2012 | Cohen | G06F 17/30303 |
| | | | 707/803 |
| 2012/0158678 A1* | 6/2012 | McGraw et al. | 707/694 |
| 2012/0158807 A1* | 6/2012 | Woody et al. | 708/204 |
| 2012/0317085 A1* | 12/2012 | Green et al. | 707/704 |
| 2012/0330911 A1* | 12/2012 | Gruenheid | G06F 17/30303 |
| | | | 707/694 |
| 2012/0330928 A1* | 12/2012 | Paulk | G06F 17/30303 |
| | | | 707/722 |
| 2013/0124525 A1* | 5/2013 | Anderson et al. | 707/737 |
| 2013/0151463 A1 | 6/2013 | Ritter et al. | |
| 2013/0166552 A1* | 6/2013 | Rozenwald | G06F 17/3071 |
| | | | 707/737 |
| 2013/0231967 A1 | 9/2013 | Jesionowski et al. | |

\* cited by examiner

JUST-IN-TIME DATA QUALITY ASSESSMENT FOR BEST RECORD CREATION

BACKGROUND

Unless otherwise indicated herein, the approaches described in this section are not prior art to the claims in this application and are not admitted to be prior art by inclusion in this section.

The present invention relates to duplicate record matching and consolidation from one or more source systems to a target system, and in particular, to just-in-time data quality assessment for best record creation during various data management processes migration or integration. For example, matching and consolidation occurs as a step in master data consolidation, data migration, or data quality verification in data warehousing, marketing list preparation, spending analysis, and the like.

Accordingly, there are many data handling scenarios in which it is necessary to match and harmonize data records from one or more source systems to the target systems. For example, one company may buy, acquire, or otherwise merge with another company. To successfully merge the business operations of the two companies, it is typically necessary to integrate the business records of both companies into a single system. However, integrating business records from disparate systems in a reliable and consistent manner can be an extremely arduous manual process. For instance, one of the companies may use one particular type of customer relationship management (CRM) system, while the other company uses another particular type of CRM system. The customer records in each of the CRM systems may differ from one another in various ways, such as, level of detail, accuracy, consistency, reliability, and the like. Before the customer records in the CRM systems are merged into a single CRM system, it often necessary to harmonize and de-duplicate the customer records from the two CRM systems, so that the most consistent, reliable and up to date data can be imported into the target CRM system. Similarly, for a particular company to migrate to a newly deployed instance of a comprehensive business planning system from legacy systems, such as existing enterprise resource planning (ERP) and human capital management (HCM) systems, it may be necessary to clean up, consolidate, and merge related records into a what is considered the best possible version of the record.

Various automated systems are available to assist with matching and consolidation of data from each of the source systems. Accordingly, records in the separate source system that concern common subjects, such as a common employee, customer, or product, can be matched and grouped together or associated with one another. In some systems, various data fields can be combined to harmonize the format or structure of the data among the matched records. For example, the customer address can be combined into a single field from records in which house number, street name, state, and zip code of an address are entered in separate fields.

To identify duplicate records and consolidate the data from these records, automated systems apply a set of predetermined rules. These rules are used to first determine the group of matching records and then consolidate the available data from all matching records into a single record by selecting which data from which source record will be used in the target system. The rules used for matching and consolidation can include routines for detecting anomalies or errors in the resulting data records. When an anomaly is detected, the record can be flagged for manual review.

Various manual review processes are typically necessary to ensure that the data records being created and/or moved from the source systems to the target systems are the best possible data records. Such manual review processes require the attention of specialized data experts, who understand how to evaluate the quality of the particular data domain. Accordingly, a human resource data expert would be needed to evaluate the quality of human resource data records to be saved in a target human resource data system, and likewise, an accounting data expert would be needed to evaluate the quality of matched or merged accounting data records. When evaluating the flagged data records, the human reviewer must rely on their understanding of the underlying data domain to detect omissions, discrepancies, or other errors. Some review process even allow for the human reviewer to manually correct the flagged data record and submit it to the target system. When correcting the flagged data record, typical manual review processes bypass the routines for detecting anomalies in the manually entered data, thus there is a significant risk that errors and inconsistencies can be submitted through the manual review process. The potential for inconsistencies increases when more than one human reviewer is tasked with manually reviewing flagged data records. One reviewer may understand that the data is entered in one format, e.g., dates entered in a day-month-year format, while another reviewer may think the data should be entered in another format, e.g., dates entered in a month-day-year format.

Thus, there is a need for improved assessment of data quality in matched or harmonized data records during best record creation. The present invention solves these and other problems by providing just-in-time data quality assessment for best record creation.

SUMMARY

Embodiments of the present invention improve systems for data quality assessment in best record creation when migrating records from multiple data sources. In one embodiment the present invention includes a method that includes receiving a best record strategy that defines how to create best record data, generating a plurality of best record creation rules based on the best record strategy, receiving a first plurality of records data from a plurality of sources, applying the plurality of best record creation rules to the first plurality of record data to generate the best record data, and generating a plurality of confidence scores corresponding to the best record data. The confidence scores describe the estimated accuracy of the best record data. The confidence scores can be used to assist at design time to refine the best record creation rules and during and after runtime to flag created best records for manual review.

In one embodiment, the best record data comprises a plurality of data fields, and wherein generating the plurality of confidence scores comprises determining at least one data field in the plurality of data fields comprising inaccurate data.

In one embodiment, the method may also include determining a comparison of the plurality of confidence scores against a threshold value, and generating an revised best record strategy based on the best record strategy and the comparison.

In one embodiment, the method may further include generating a plurality of revised best record creation rules based on the revised best record strategy.

In one embodiment, the method may further include receiving a second plurality of record data from the plurality of sources, applying the plurality of best record creation rules to the second plurality of record data to generate a subset of the second plurality of record data, and receiving user input comprising edits to at least some of the subset of the second plurality of record data.

In one embodiment, the method may further include applying the plurality of best record creation rules to the user input to verify compliance with the best record strategy.

In one embodiment, the method may further include applying edits to the at least some of the subset of the second plurality of record data to the best record data.

Another embodiment of the present disclosure includes a non-transitory computer readable medium comprising instructions, that when executed by a computer processor cause the computer processor to be configured for: receiving a best record strategy that defines how to create best record data, generating a plurality of best record creation rules based on the best record strategy, receiving a first plurality of record data from a plurality of sources, applying the plurality of best record creation rules to the first plurality of record data to generate the best record data, and generating a plurality of confidence scores corresponding to the best record data, wherein the confidence scores describe the estimated accuracy of the best record data.

Yet another embodiment of the present disclosure includes a system comprising a computer processor, a non-transitory computer readable medium coupled to the processor and comprising instructions, that when executed by the computer processor cause the computer processor to be configured to, receive a best record strategy, wherein the best record strategy defines how to create best record data, generate a plurality of best record creation rules based on the best record strategy, receive a first plurality of record data from a plurality of sources, apply the plurality of best record creation rules to the first plurality of record data to generate the best record data, and generate a plurality of confidence scores corresponding to the best record data, wherein the confidence scores describe the estimated accuracy of the best record data.

The following detailed description and accompanying drawings provide a better understanding of the nature and advantages of the present invention.

DETAILED DESCRIPTION

Described herein are techniques for just-in-time data assessment for best record creation during data migration or integration. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for just-in-time data quality assessment during best record creation. Such embodiments include multi-phase techniques for defining, qualifying, and applying best record creation and validation rules for integrating data from multiple associated data records based on a predefined best record creation strategy. The data records can originate from multiple data sources, such as a customer relationship management (CRM) systems, an enterprise resource planning (ERP) systems, accounting systems, and the like. In some embodiments, the first phase may include generating a number of rules for consolidating information from matched data records from multiple sources based on a predetermined record migration and consolidation strategy. The records can be matched based on similarities between various data field entries. For example, records from CRM, ERP, and accounting systems can be matched to one another based on customer number, name, or identifier. To consolidate the data from the various data fields of the matched records into a best version of the record, embodiments of the present invention can generate best record creation rules based on the predetermined strategy. The resulting best records can then be evaluated by one or more corresponding validation rules.

One simplified example strategy for best record creation can include defining which record source will be the trusted source for each data field in the resulting best records. For instance, the CRM can be designated as the trusted source to populate the customer name and address fields, while the accounting system can be designated as the trusted source for product names and descriptions fields. In some embodiments, the best record creation rules can also include or be associated with data validation rules. Data validation rules can include a number of requirements for each one of the fields in the resulting best record. The validation rules can include requirements for the format and/or data type allowable for each one of the data fields in the resulting best records. For example, a company name field may be limited to strings, while customer balances may be limited to numerical values with only two decimal places. The validation rules may also include the requirement that specific data fields must be populated, e.g., each resulting best record must include a customer identifier or name.

The best record creation rules generated based on the predetermined best record creation strategy can then be tested using various embodiments of the present disclosure.

In one embodiment, the best record creation rules can be applied to a subset of the available matched data records. Testing the best record creation rules may include determining the number of fields in the resulting best records that fail or contradict the validation rules. If the number of fields that fail the validation rules is below a predetermined threshold, then the best record creation rules can be considered viable. However, if the number of fields that fail the validation rules is greater than the threshold, then information regarding which of the fields fail the validation rules can be used to adjust the best record creation rules. Once a user is satisfied with the validation results using a particular set of best record creation rules applied to a sample set of the data records, then the best record creation rules can be stored to a strategy database.

When needed, the best record creation rules can be retrieved from the strategy database and applied to larger batches of records to be imported or migrated. Applying the best record creation rules to a particular batch of matched data records from multiple data sources may include automatically applying the validation rules to each field of the resulting best records. Any resulting best record that fails the validation rules for a predetermined number of fields within that record can be flagged for manual review. A qualified reviewer may review and/or edit a flagged record before submitting it to the target system. While the reviewer is viewing and editing the fields of a particular flagged record, embodiments of the present disclosure may also include monitoring user input received from the reviewer to verify compliance with the validation rules. Accordingly, a reviewer may not inadvertently or intentionally enter data into a field that violates the validation rules. For example, the reviewer may not enter an unconstrained string into a field that requires a numerical value or hexadecimal value. Various details and aspects of the present invention will now be described in reference to specific examples in reference to the figures.

Just-in-Time Data Quality Assessment System

Figure 1:
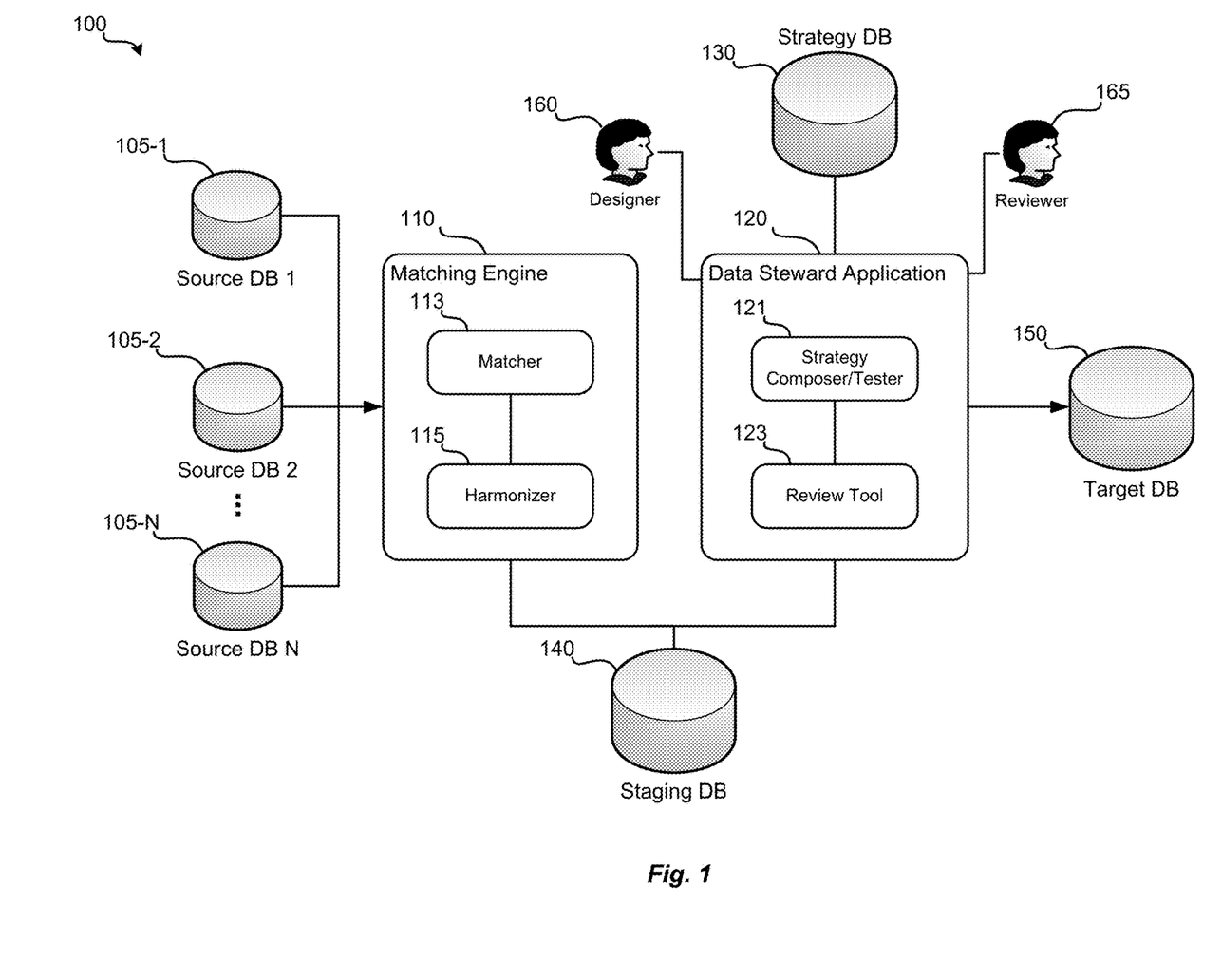
FIG. 1 is a block diagram of a system for just-in-time data quality assessment for best record creation, according to one embodiment of the present disclosure.

FIG. 1 illustrates a system 100 for assessing the quality of data generated during best record creation according to various embodiments of the present disclosure. As shown, system 100 may include a data steward application 120 coupled to a staging database 140. The data steward application 120 may also be coupled to a strategy database 130 and a target database 150. Data steward application 120 may include various components or functionality, such as the strategy composer/tester 121 and a best record review tool 123. While not shown, data steward application 120 may also include various user interface capabilities for use by a best record creation strategy designer 160 or best record reviewer 135. Such user interface capabilities may be implemented as a network interface layer within data steward application 120 accessible to the designer 160 and the reviewer 135 via remote or local computer terminals connected to the computer executing the data steward application 120.

System 100 may also include a matching engine 110 coupled to a number of source databases 105. The source databases 105 may include or represent various types of data sources and systems. For example, the source databases 105 may include CRM, ERP, accounting, HRM systems, and the like. Traditionally, records stored in each one of the source databases 105 may be organized in columns, such that each record includes a number of rows representing individual records with data entries for each one of those individual records in a designated column. For example each row can represent a record for a particular customer with columns representing different data associated with that particular customer. Accordingly, a customer record may include columns for a customer name, a customer address, a customer phone number, a customer credit limit, etc. However, the records from each one of the source databases 105 may not be organized or formatted in the same way as the records from the other source databases 105. Accordingly, the matching engine 110 may first associate records from each one of the source databases 105 by matching one or more similar data fields using the matcher functionality 113. Once some or all of the data records from the source databases 105 are grouped together according to matching data fields, the harmonizer 115 may harmonize the formatting or grouping of the data in the data fields if they are not consistent from one source database 105 to the next. For example, source database 1 105-1 may store a customer address in three different fields. One field for the house number, one field for the street name, and one field for the street designation, e.g., street, road, drive, lane, etc. Meanwhile, source database 2 105-2 may store customer addresses in a single field, e.g., a field in which the house number, street name, and street designation are stored in a single field. The harmonizer 115 can harmonize or combine the address related fields from the source database 1 105-1 into a single address field so that is consistent with the address fields from the other source databases 105. Once all of the source data is matched and harmonized, the matching engine 110 can store the matched data records in the staging database 140.

Each of the components shown in FIG. 1 can be implemented as a combination of hardware, firmware, and software in one or more computing devices including, but not limited to, personal computers, computer terminals, and server computers in electronic communication with one another over one or more electronic communication media or protocols.

Strategy Composer/Tester

With some or all of the source data records matched and harmonized in staging database 140, the data steward application 120 can be activated to begin developing a best record creation strategy. As used herein, a best record creation strategy includes the specification of rules for reading the data from matched data records and creating a single best record for migration or importation into the target database 150. While only one target database 150 is shown, various embodiments may also store the resulting best records in multiple target databases or systems. In some embodiments, the best record creation strategy may include designation of the preferred or trusted source database 105 for any specific data fields in the resulting best records. For example, source database 1 105-1 may be designated as the trusted source for populating the first three data fields of the resulting best records, source database 2 105-2 may be designated as the trusted source for populating the next three data fields, and source database N 105-N may be designated as the trusted source for populating the final three data fields. The rules of the best record creation strategy may also include validation rules for verifying or evaluating the data fields of the resulting best records. For example, the validation rules may define which data fields in the resulting best record must be populated and which data fields are subject to requirements or restrictions on the size, format, data type, and the like. The strategy composer/tester 121 can include a user interface through which it can receive user input that specifies rules for creating the best records. The user interface can include controls and data fields for receiving user input indicating global and data field specific rules based on a best record creation strategy from the designer 160. The strategy composer/tester 121 can then save the best record creation rules in the strategy database 130. In some embodiments, the best record creation rules stored in the strategy database 130 can be associated with a particular strategy identifier and/or a set of source database identifiers. The data steward application 120 may then retrieve a set of best record creation rules by referring to a corresponding identifier.

Whenever the steward 120 needs to migrate a batch of data records from one or more source databases 105 associated with a particular best record strategy, the data steward application 120 can retrieve the previously generated best record creation rules from the strategy database 130. In some embodiments, the matched and harmonized data records from the data sources 105 can be stored in the staging database 140 by matching engine 110. The data steward application 120 can then retrieve the batch of data records from the staging database 140 and apply the best record creation rules retrieved from the strategy database 130. Applying the best record creation rules may also include applying validation rules to the data fields of the resulting best records. Based on the results of the validation rules, the data steward application 120 may determine a confidence score for each of the resulting best records. A confidence score may be based on the number of data fields in a particular resulting best record that fail one or more the validation rules. If the confidence score for a particular resulting best record is below a predetermined threshold value, then that best record may be flagged for manual review.

Once a record is flagged for manual review, the data steward application 120 may present the flagged best record to a reviewer 165 using a user interface included in the review tool 123. In some embodiments, the review tool 123 can load the applicable validation rules from the strategy database 134 and reference them during the manual review process. Any and all of the flagged best records may be displayed to the reviewer 135 with visual indications of which fields caused the best record to be flagged. The visual indications may include descriptions or error codes for identifying the type or nature of how a particular field failed the validation rules. The reviewer 165 can then dismiss the flags on a field-by-field basis or choose to correct the data within the flagged field manually before submitting the resulting best record to the target database 150. If the reviewer 165 chooses to edit the data in any particular field within the flagged best record, the review tool 123 can apply the validation rules to the edited data to give real time feedback to the reviewer 165 to ensure that any data manually entered by the reviewer complies with the applicable validation rules. Such just-in-time application of the validation rules to manually entered data ensures that the manually reviewed best records include the most reliable and consistent data.

Figure 2:
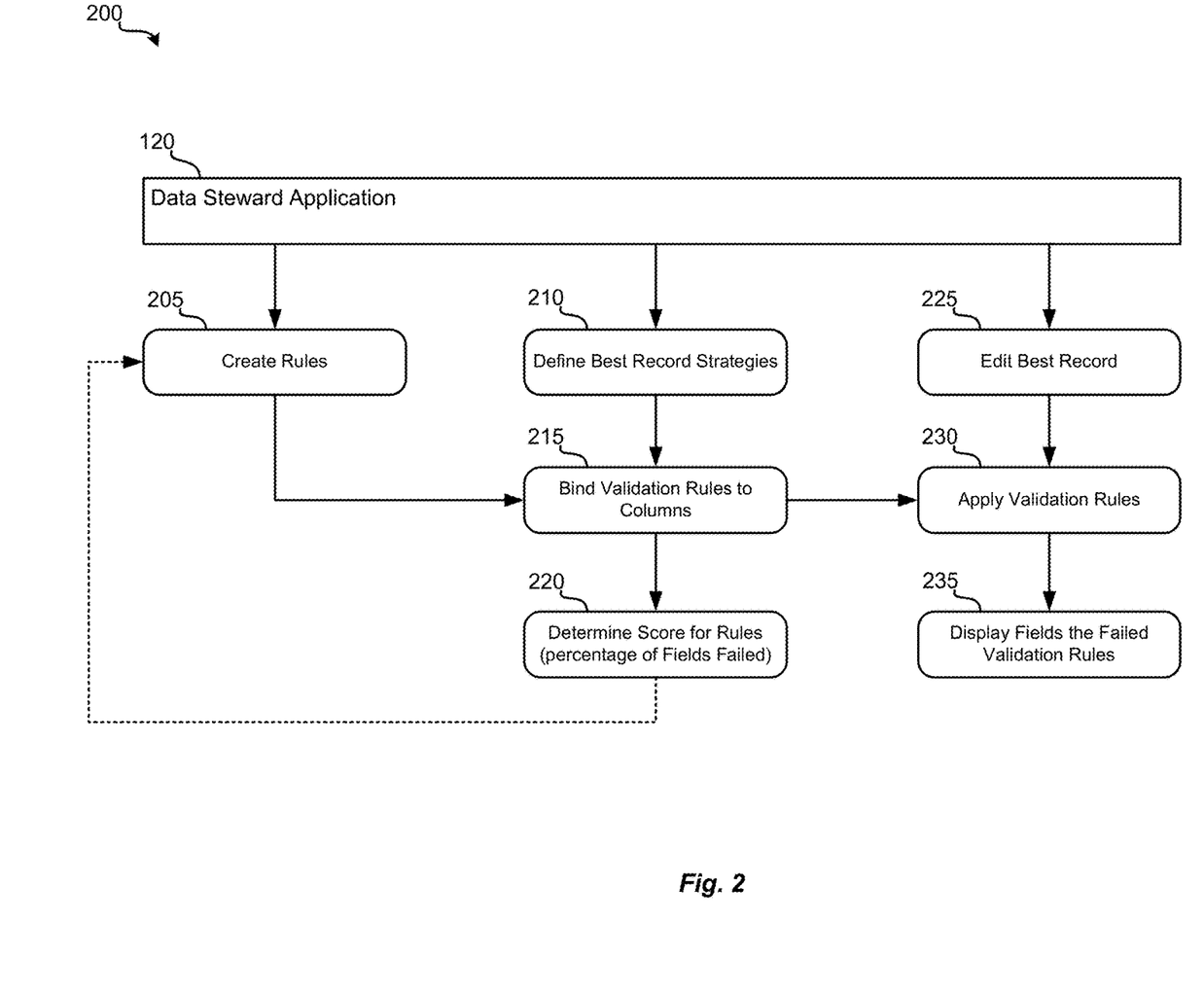
FIG. 2 illustrates an example data flow for just-in-time data quality assessment for best record creation according to one embodiment of the present disclosure.

FIG. 2 illustrates a functional diagram 200 of data steward application 120 operating to define and apply best record creation strategies during the migration or importation of data records from multiple source systems to one or more target systems. The data steward application 120 can begin creating best records by creating best record creation rules at box 205. The best record creation rules that the data steward application 120 generates at box 205 may include a library of generic or specialized rules that can be applied to one or more data fields within a particular resulting best record. For example, a particular rule may include a requirement for a particular type of data. Another particular rule may include a limit on the number of decimal places for a numerical value. As used herein, the terms "source database" and "source system" can be used interchangeably to refer to any source of data or records. Similarly, the terms "target database" and "target system" can refer to any final or intermediate target into which data from the source systems is being moved according to a best record creation strategy.

The data steward application 120 may also, in response to user input, define various best record creation strategies, at box 210. In some embodiments, the data steward application 120 may generate the best record creation strategy prior to creating the best record creation rules, at box 205. In such embodiments, the data steward application 120 may create the best record creation rules in response to the best record creation strategy.

The best record creation strategy defined at box 210 may include a user supplied or automatically generated evaluation of multiple data sources. Accordingly, the best record creation strategy may include a designation of which data sources will be used as the source for particular data fields in resulting best record. For example, the best record creation strategy may include information that indicates one data source include records with data fields populated by consumers and, as a result, may be known to include significant or excessive typographical errors and inconsistent abbreviations. In contrast, another data source may be populated by trained technicians who have been instructed in established best practices for data entry, such that the data records contained in that data source are likely to be more reliable than the records in the consumer populated data source. Since data records in the source systems and target systems can be organized in tables, such that each data record may be represented by a row comprising a number of columns, the best record creation strategy may include information about which data source is the most reliable source for populating individual columns in resulting best records. At box 215 the data steward application 120, using the strategy composer/test 121, can bind specific best record creation rules to specific columns or data fields based on the best record creation strategy. As indicated in box 215, binding the best record creation rules may include binding validation rules to the columns.

From box 215, the data steward application 120 can test the bound best record creation rules, including the validation rules, by applying rules to a sample set of matched and harmonized data records to generate a representative set of best records. To determine the score for the rules at box 220, the data steward application 120 may determine the number data fields in the representative set of best records that fail or violate the bound validation rules. In some embodiments, the score for the rules can include or be based on the percentage of fields in the resulting best records that fail or violate the validation rules. Failure or violation of the validation rules may indicate that the data entry for a particular data field or column is inaccurate or unreliable.

To determine whether the rules are effective in generating the best records possible, the data steward application 120 may display records with a number or percentage of failed fields above a threshold value, e.g., more than one failed field, to a designer to verify that the fields actually failed the validation test. If the failed fields are indeed failed fields, then the designer can determine that the rules are effective or that the best record creation strategy needs to be edited. For example, editing the best record creation strategy may include determining that data fields in the resulting best records may need to be populated with data from a different data source. If the failed fields include more than a threshold number of false positives (i.e., fields flagged as failing the rules that actually include accurate and viable data), then the designer may also revise the best record creation and/or validation rules. If the best record creation or validation rules are revised, then the designer can then test the revised rules by applying them to the same or a different representative set of records from the source systems.

Once the revised validation rules are applied to a representative set of records, the data steward application 120 can generate a new score and possibly a subset of resulting best records with flagged fields. Based on the score and/or the designer's evaluation of the flagged fields, the data steward application 120 can evaluate the revised rules. If the data steward application 120 determines that best record and validation rules are satisfactory, then the rules can be stored for use in future migrations of data records from the same data sources from which the representative best records were received.

As discussed above, when the data steward application 120 applies the best record creation and validation rules during data migration, it can flag any of the resulting best records with fields that fail or violate the validation rules. The data steward application 120 can then present the flagged data records or data fields to a reviewer. Using editing tools and controls included in the data steward application 120, the reviewer can edit any of the flagged best records at box 225. While the reviewer is editing any of the flagged data fields, the data steward application 120 can apply the validation rules 230 used during the migration to ensure consistency with the previously migrated data. If any of the data entered manually by the reviewer during the editing process fails or violates the validation rules, the data steward application 120 may display or otherwise indicate which edited fields fail the validation rules. In some embodiments, and edits made by the reviewer will be prohibited from being submitted to the target database 150. In other embodiments, however, the reviewer 165 may be allowed to override the indication of a failed validation rules and submit the manually edited best record to the target database 150.

Figure 3:
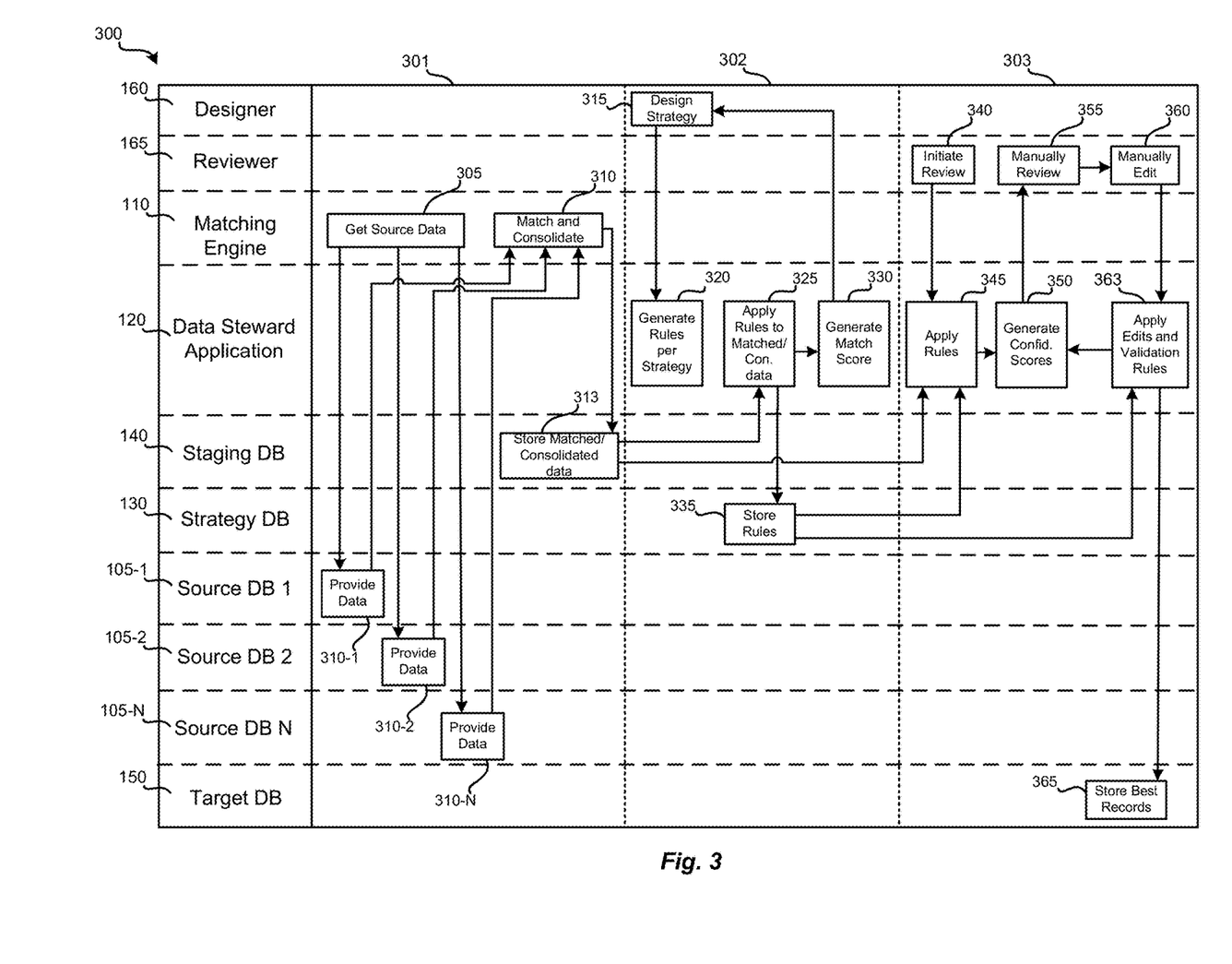
FIG. 3 a flowchart for just-in-time data quality assessment for best record creation according to one embodiment of the present disclosure.

FIG. 3 illustrates an example data flow of just-in-time data quality assessment for best record creation according to various embodiments of the present disclosure. As shown, the process of generating best records may be segmented into three interrelated processes. These processes may include, but are not limited to, generating and storing matched and harmonized data in the processes contained in region 301, designing and testing best record creation and validation rules in the processes contained in region 302, and reviewing flagged best records that violate or fail the validation rules in the processes contained in region 303.

In some embodiments, generating and storing the matched and harmonized data in the processes of region 301 may occur before the processes in regions 302 and 303 can be performed by separate computing systems. In other embodiments, the processes in 301 may be performed in a single process and in the same computing system as the processes of 302 and 303. In either scenario, the process of matching and consolidating data from multiple source databases 105 can begin with matching engine 110 generating get source data requests in box 305. The get source data requests can then be sent to the individual data sources 105. The get source data requests can include requests for all or some sample set of records from the data sources 105. In response to the get source data request, each of the source databases 105 can provide the requested data in boxes 310 and send the requested data back to the matching engine 110. The matching engine 110 can then harmonize the data records according to a preferred data record format so that the data fields of the data records are harmonized in a consistent fashion across all source databases 105, at box 310. The matching engine 110 may also then associate data records from each one of the source databases 105 based on comparisons of similar data fields, at box 310. The matched and harmonized data can then be stored to staging database 140, at box 313.

With the matched and harmonized data stored in the staging database 140, the data steward application 120 may begin the processes in 302 to design a best record creation strategy and associated best record creation and validation rules. In some embodiments, the processes in 302 may begin in response to a best record creation strategy received from designer 160, at box 315. Based on the specifications included in the best record creation strategy, the data steward application 120 can generate rules at box 320. The rules can define how the stored matched and harmonized data from the multiple source databases 105 will be combined and validated to generate the best possible data record. The rules can then be applied to the matched and harmonized data at box 325. In box 330, the data steward application 120 can generate a score to assess the effectiveness of the generated rules. As mentioned above, the rules can include validation rules for detecting whether the resulting best record is accurate and reliable. Any fields that are determined to fail or violate the validation rules can be flagged and presented to the designer 160. In some embodiments, a confidence score based on the number of flagged data fields can be generated at box 330. Any data records that have a confidence score outside of a predetermined tolerance range may be presented to the designer 160 so that he or she may revise they best record creation strategy. In response to the type and number of failed data fields, the designer 160 may create a revised best record creation strategy in box 315 that the data steward application 120 may use to generate a revised set of rules at box 320. Each iteration of boxes 315 through 330 can then proceed as previously described until the confidence score generated in box 330 is satisfactory to the data steward application 120 and/or the designer 160. In each iteration of generating the best record creation rules and validation rules, the generated rules can be stored in the strategy database 130 at box 335. During the design process 302, the data steward application 120 may apply the generated rules to only a subset of the available stored matched and harmonized data to reduce the time necessary between iterations. In some embodiments, the same subset of matched and harmonized data may be used for each iteration. In other embodiments, the subset of matched and harmonized data may be systematically or randomly reselected in between iterations.

With the matched and harmonized data stored in the staging database 140 and the best record creation and validation rules stored in the strategy database 130, the data steward application 120 may begin the processes in 303. In response to a request to initiate review 340 received from the reviewer 165, the data steward may apply the rules to the associated matched and harmonized data, at box 345. For each resulting best record generated by the application of the best record creation rules, general and data field specific validation rules may also be applied to the individual data fields within each record. Based on the number of data fields within each of the resulting best records and the application of the validation rules, the data steward application 120 may generate a confidence score at box 350. The data steward application 120 may flag any resulting best records with confidence scores outside of a predetermined tolerance to be presented to reviewer 165 for manual review. The reviewer 165 that may manually review any flagged data fields in the presented resulting best records in box 355. If necessary, the reviewer 165 may manually edit any of the data fields, flagged or not, within the suspect resulting best records in box 360. In response to the manual edits received from the reviewer 165, the data steward application 120 may apply the edits and the applicable validation rules at box 363. If any of the manual edits received from the reviewer 165 violate the validation rules, the data steward application 120 may indicate that the change is prohibited and/or prohibit the reviewer 165 from submitting the best records to the target database 150. In some embodiments, the data steward application 120 may allow the reviewer 165 to override the violated validation rules and submit the manual edits to the target database 150. In either case, the target database 150 can store the resulting best records at box 365.

Some embodiments of the present disclosure can be implemented in one or more computer systems and/or data stores executing one or more sets of computer executable code or instructions. However, for the sake of clarity, one example embodiment, implemented by a single computing system, for designing, creating, and testing best record creation and validation rules will be discussed in reference to the flowchart of method 400 in FIG. 4. One of ordinary skill in the art will recognize some or all of the actions described in reference to FIG. 4 may be executed by one or more physical or virtual processors or server computers in series or in parallel, i.e., executed in a cloud computing configuration. Method 400 can begin at action 405, in which a computing system, such as a computing system executing functionality of the data steward application 120, may receive a best record creation strategy that defines how to create best records from multiple data sources. As noted above, the best record creation strategy can include specifications indicating which data source will be used to populate each particular data field/column within the resulting best records. In action 410, the computing system may receive or retrieve matched and harmonized data from multiple data sources. The matched and harmonized data may be stored in a single staging data store, or it may be gathered from each individual data source individually.

Figure 4:
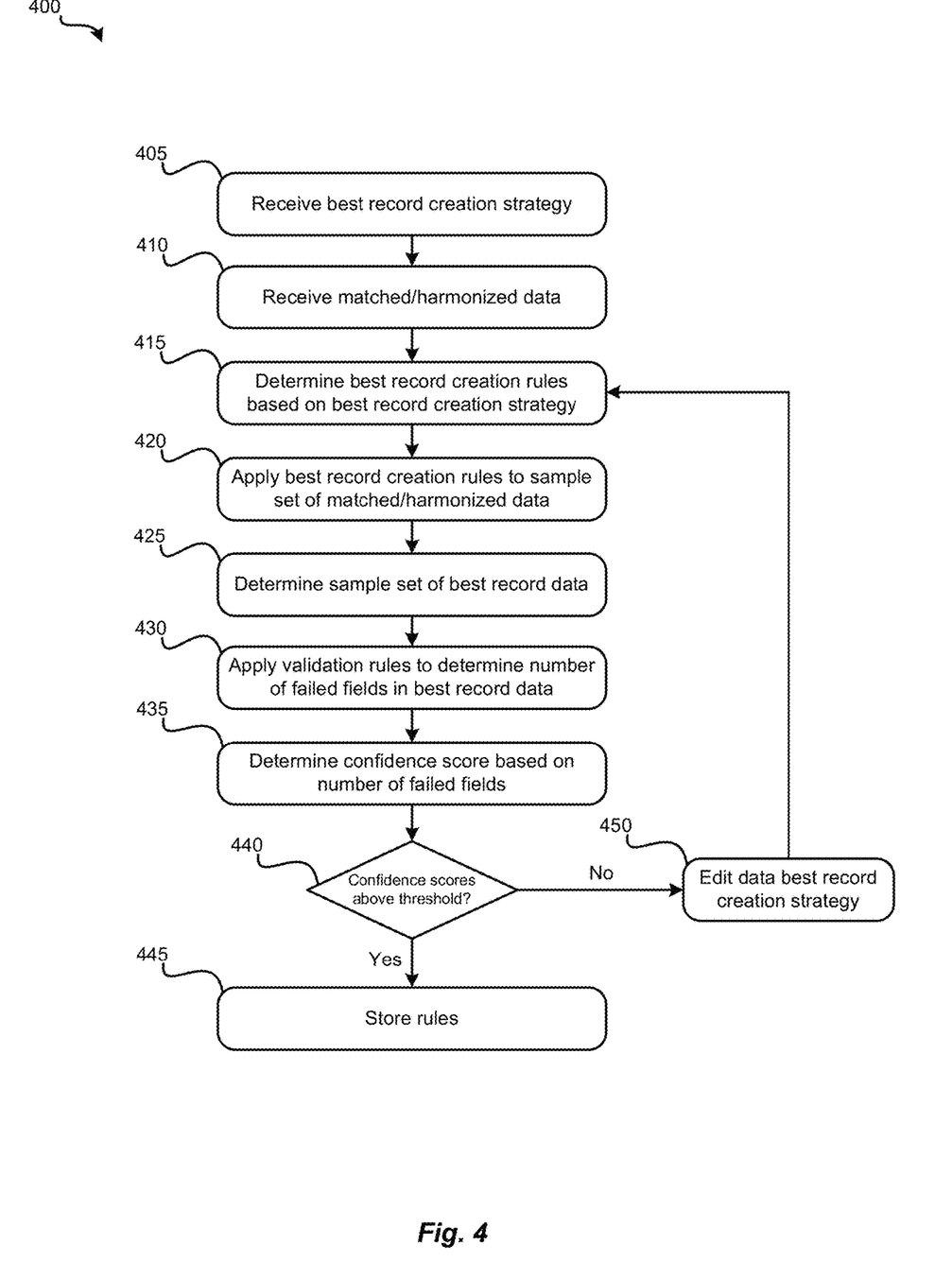
FIG. 4 a flowchart of a method for creating rules for just-in-time data quality assessment for best record creation according to one embodiment of the present disclosure.

The computing system may determine a set of best record creation rules and/or validation rules based on the best record strategy, in action 415. Determining the best record creation or validation rules may include binding particular rules and requirements to particular data fields and/or columns of the matched and harmonized data. Such rules may include formulas and expressions for testing or qualifying the data.

To test the effectiveness and reliability of the created best record creation and validation rules, the computing system can apply the rules to a sample set of the matched and harmonized data, in action 420. In some embodiments, the sample set of matched and harmonized data may include all of the matched and harmonized data records received from the multiple data sources. However, in other embodiments, the sample set of matched and harmonized data may include only a subset of all of the matched and harmonized data available from the multiple data sources. By only testing a subset, or batch, of the available matched and harmonized data, the computing system can rapidly provide feedback to the designer 160 without processing all the data, thus reducing the amount of time needed to define the best record creation and validation rules.

In action 420, the computing system may apply the best record creation rules to the sample set of the matched and harmonized data to determine a sample set of best records in action 425. In action 430, the computing system can determine a number of fields in the sample set of best records that fail the validation rules. Determining the number of fields in the sample set of best records that fail may include determining columns within the records that fail the corresponding bound validation rule. In action 435, the computing system may determine, or otherwise generate, a confidence score for the sample set of best records based on the number of fields within each record that fail the validation rules. In some embodiments, the confidence score can include a percentage value of the number of fields that fail the validation rules. In other embodiments, the confidence score can include an integer number of the fields that fail the validation rules. In any such embodiments, the computing system can determine whether the confidence score for the sample set of best records is acceptable by comparing the generated confidence score with a threshold value, in determination 440. For example, the tolerance for failed data fields in the sample set of best records may be set at 20% failed fields, thus the threshold confidence score value may be set at 80%. Accordingly, in embodiments in which the confidence score is a percentage of valid data fields, a sample set of best records generated using the best record creation validation rules with a confidence score of 80% or higher may be determined to be acceptable. In such embodiments, if the sample set of best record has a confidence score above the threshold value, the associated set of best record creation and validation rules can be stored in action 445. However, if the sample set of best records has a confidence score below the threshold value, then the computing system may edit the best record creation strategy in action 450. In some embodiments, editing the best record creation strategy may be automatic. Automatically editing the best record creation strategy may include cycling through each of the data sources as the source for each one of the fields in the sample set of best records. In other embodiments, editing the best record creation strategy may include prompting the designer 160 to alter the best record creation strategy. Prompting the designer 160 to alter the best record creation strategy may include displaying a representation of the resulting best records produced with the associated best record creation and validation rules with indications of the fields that fail the validation rules. The designer 160 may choose to manually alter the best record creation strategy and restart method 400 beginning at action 415. This process can continue until the confidence score for the resulting sample set of best records is above the threshold value. In other embodiments, the designer 160 may lower the confidence score threshold value to allow a particular set of best record creation and validation rules to be saved as the working set of rules in action 445.

Figure 5:
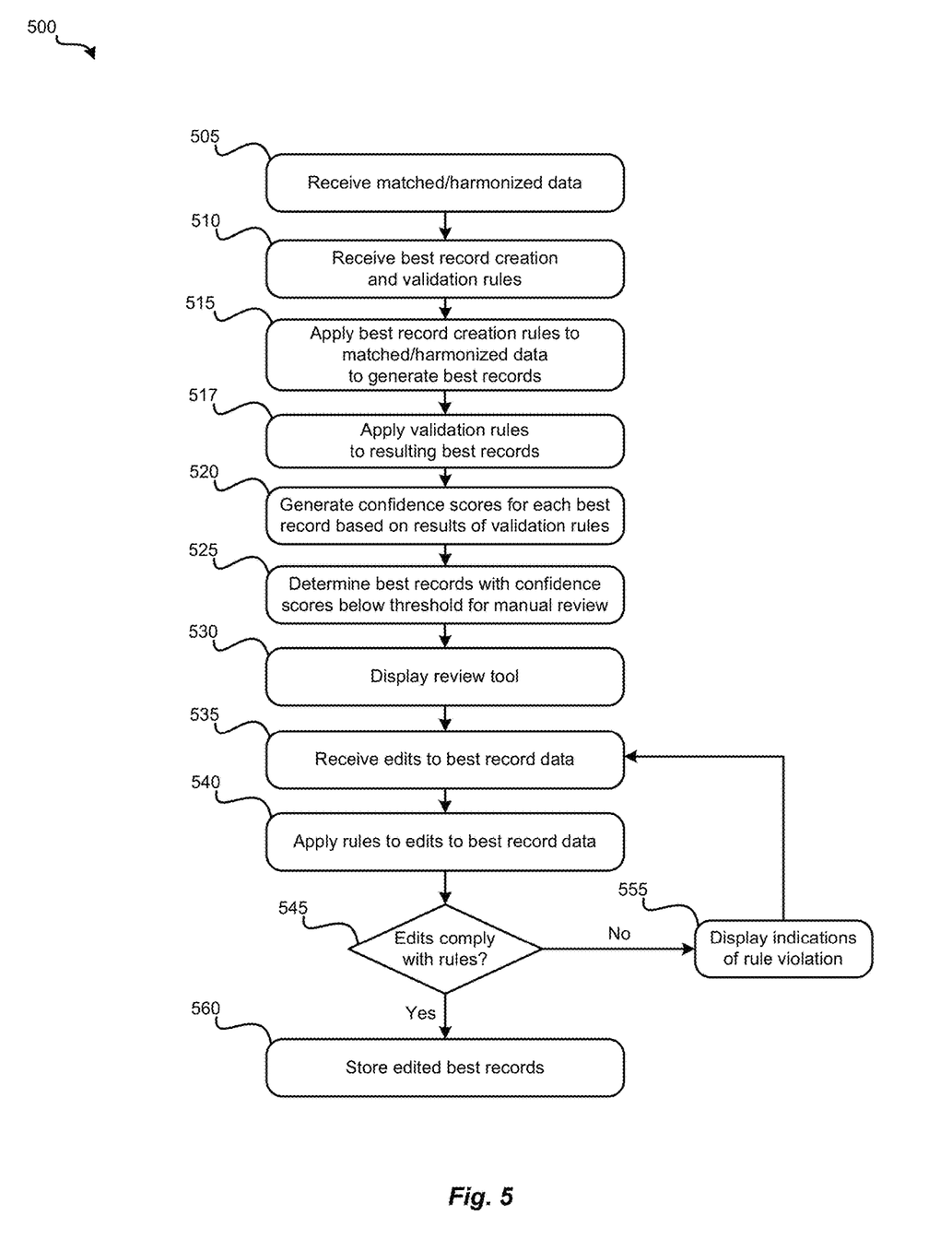
FIG. 5 a flowchart of a method for reviewing best record creation results with just-in-time data quality assessment according to one embodiment of the present disclosure.

FIG. 5 is flowchart of a method 500 for providing a manual review with just-in-time data quality assessment of best records created during a migration or consolidation of data from multiple source systems to one or more target systems. As with method 400 described above in reference to FIG. 4, method 500 may be implemented as computer executable code executed by one or more physical or virtual processors or server computers in series or in parallel. For the sake of clarity, one example embodiment may be implemented by a single computing system executing one or more sets of executable code or instructions for providing a review tool and/or user interface for reviewing and editing best records created in accordance with various best record strategies or best record creation and validation rules. In one embodiment, method 500 may begin in action 505 in which the computing system receives or retrieves matched and harmonized data determined from one or more multiple data sources, such as separate business information and intelligence systems. In some embodiments, the computing system can receive the matched and harmonized data from a staging data store compiled by a separate computing system, e.g., matching engine 110, in action 510. The matched and harmonized data may include all of the data to be moved or migrated from the multiple data sources. However, the received matched and harmonized data may also include a portion or batch of the data to be moved or migrated from multiple data sources. The computing system may also receive or retrieve best record creation and validation rules from one or more external sources, such as the strategy database 130.

In action 515, the computer system can apply the best record creation rules to the matched and harmonized data to generate a number of resulting best records. In action 517, the computing system applies the validation rules to the resulting best records. Applying the validation rules to the resulting best records may include applying one or more qualification condition to fields or columns, and determining whether the qualifications are met. Fields or columns that do not satisfy the qualifications are considered to be failed fields or columns.

In action 520, the computing system may generate a corresponding confidence scores for each of the resulting best records. In some embodiments, the confidence score can be based on the number of fields in a particular best record that violate or fail the validation rule to which that field is bound. In action 525, the computing system can determine best records with confidence score values below a threshold value. Best records with confidence scores below the threshold value may be flagged for manual review. Best records with confidence scores greater than or equal to the threshold value may be immediately stored in a target system. The computer system may then display the flagged best records in a review tool 123, in action 530. As described herein, the review tool may include a user interface with controls and data entry fields for verifying and editing any and all of the data fields in a flagged best record. Accordingly, the computing system can receive edits to the best records, in action 535.

While the review tool is active and/or after the reviewer 165 submits the edits to the best records, the computing system can apply the validation rules to the edits received as user input through the review tool 123. In action 545 the computing system can determine whether the edits received from the reviewer 165 comply with the corresponding validation rules. If the edits comply with the validation rules, then the edited best records can be stored in the target system in action 560. However, if in determination 545, the computing system determines that the reviewer 165 is attempting to enter data that fails or violates the validation rules, then the computer system may display indications of a rule violation, in action 555. For example, if the reviewer 165 attempts to enter a string of 20 letter characters for a customer identifier data field bound to a validation rule that restricts the field to only 10 numeric digits, then the computing system may display the customer identifier data field with a visual indication of an error. For example, the visual indication may include highlighting the violating data field in a contrasting color, rendering text near or over the violating data field, or the like. In any such embodiments, the computing system may offer the reviewer 165 another chance to revise or edit the violating data field until it complies with the corresponding validation rule, in actions 535 through 545. Once the edited best record data in a particular best record complies with the corresponding validation rules, then the computing system may store best record in the target system, in action 560.

Examples

Figure 6:
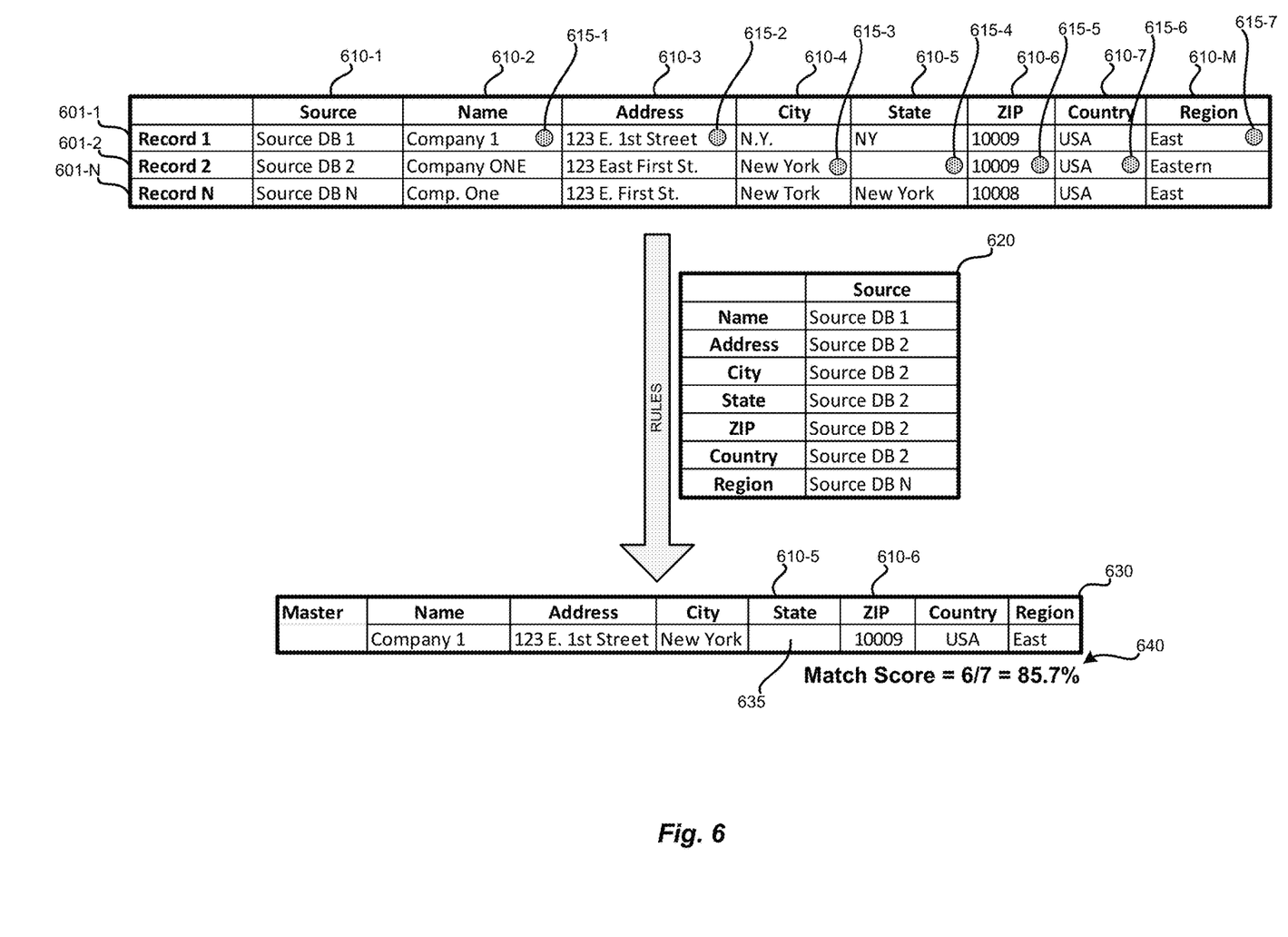
FIG. 6 illustrates an example best record creation just-in-time data quality assessment with according to one embodiment of the present disclosure.

FIG. 6 illustrates an example implementation of a particular set of best record creation rules to a particular set of matched and harmonized data according to embodiments of the present disclosure. As shown, the matched and harmonized data may include a number of matched and harmonized records 601. While the specific example shows three distinct records, embodiments of the present disclosure may be applied to as many as N records, where N is a natural number. As discussed herein, the matched and harmonized records 601 may be generated by the data steward application 120 in a computing system or by a matching engine 110 executed by the same computer system or in a separate computing system. In either case, the matched and harmonized record 601 may include data records from multiple data sources that are determined to be matched, include duplicate information, or intended to include information about a similar subject, such as a product, customer, business entity, or the like.

Each of the matched and harmonized records 601 may include a number of data fields. As shown in FIG. 6, the data fields are represented in the table of matched and harmonized data as columns in a table of matched and harmonized records 601. In some embodiments, the number of columns 610 can be determined during a normalization process when the matched and harmonized data records 601 are matched with one another. Since matched and harmonized record 601 may be derived from data records from disparate data sources that may have included more or fewer data fields or columns, during the matching and consolidation process, the number of columns can be normalized according to a predetermined standard. The standard can describe the data fields that are to be included in the resulting best records and may, in some embodiments, be derived from the specifications or data requirements of the target system.

In the specific example shown in FIG. 6, the columns 610 include fields for specifying metadata about each record 601, such as the corresponding sources 610 of the data. Columns 610 may also include labels where descriptions and the actual data 610-2 through 610-M, where M is a natural number, are stored. In this particular example, columns 610 may include headers for the name, address, city, state, zip, country, and region associated with each of the records 601. Part of determining the best record creation strategy may include indicating which source will be used to populate corresponding fields in the resulting best record 630. In some embodiments, in which the strategy composer/tester 121 includes a graphical user interface (GUI), receiving the best record creation strategy may include providing a designer 160 with visual indications or controls 615 to designate the source for each of the columns. In the specific example shown, "source DB 1" is specified as the preferred source for the name, address, and region, as indicated by indicators 615-1, 615-2, and 615-7. Similarly, "source DB 2" is specified as being the preferred source for the city, state, zip code, and country fields, as indicated by indicators 615-3 through 615-6. Alternatively, the data source for each of the columns may be indicated in a table of best record creation rules 620. As shown, the source designator may be bound to the column as illustrated by table 620 of best record creation rules.

By applying the best record creation rules 620 to the matched and harmonized data records 601, the computing system may generate the resulting best record 630. In the example shown, the resulting best record 630 includes a blank entry 635 for the state column 610-5. As described herein, the computer system may generate a confidence score 640 for the best record creation rules 620. In the particular example shown, a percentage score may be generated based on the number columns for which the best record creation rules 620 fail to produce an entry and/or the number of columns that violate an associated set of validation rules. For example, the validation rules may indicate that column 610-5 for the state must include an official two letter abbreviation. Thus, the best record creation rules that populate the state column 610-5 with an entry that is more than two letters, an entry that has two letters but is not an official abbreviation, or a blank entry, would violate associated validation rules for that particular column 610-5. Similarly, column 610-6 for the ZIP Code may be associated with validation rules that require the column to be non-empty and include only five numeric characters that are included in a list of acceptable ZIP Codes. In the particular example shown, the entry of "10009" in column 610-6 of the best record 630 complies with the associated validation rules, and would therefore be considered a valid entry in the determination of the confidence score.

The confidence score 640 for example best record 630, assuming that entries for all columns 610, except entry 635 for column 610-5, comply with the corresponding validation rules, would be 85.7%. The data steward application 120 may then compare the confidence score to a threshold value to determine whether the best record creation rules 620 or the resulting best record 630 can be trusted or considered reliable. In the event that the designer 160 or the computing system determines that the confidence score of 85.7% is below acceptable threshold value, the designer 160 or the computer system may edit and reapply the best record creation tools 620 to the matched and harmonized records 601 until an acceptable confidence score is obtained. During the design process, the matched and harmonized records 601 may represent only a subset of the available matched and harmonized data to increase the speed of the iterations needed to determine the efficacy of the best record creation rules 620.

Figure 7:
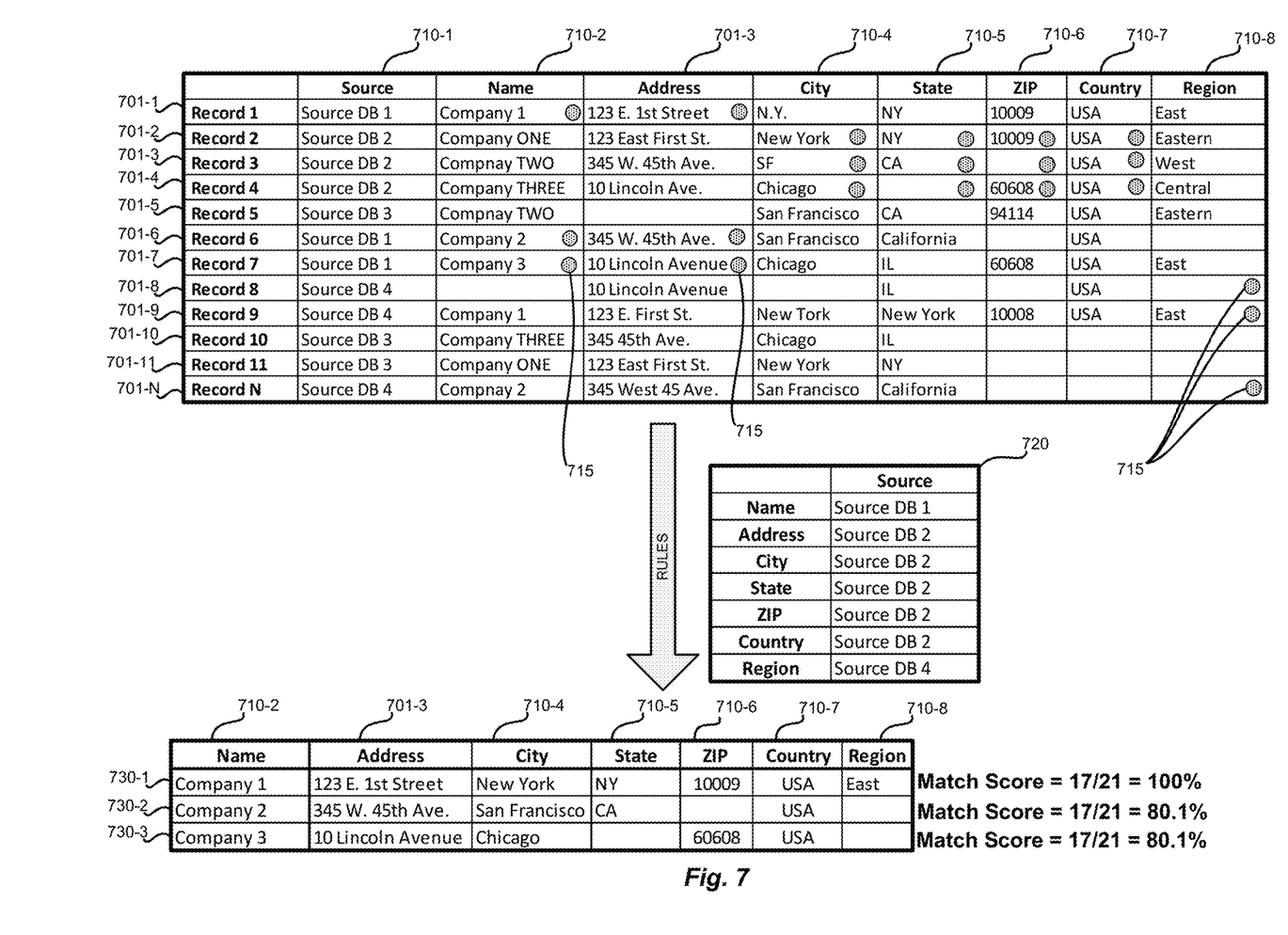
FIG. 7 illustrates another example best record creation just-in-time data quality assessment with according to one embodiment of the present disclosure.

FIG. 7 illustrates the application of best record creation and validation rules to a specific set of matched and harmonized data, according to embodiments of the present disclosure. As shown, the matched and harmonized records 701 may include a number of columns 710 with indications of the trusted source 715 for populating the specific columns of the resulting best records 730. The matched and harmonized data may include records for a number of companies as indicated by column 710-2 from a number of source databases. In the specific example, there are three companies, with names "company 1", "company 2", and "company 3". In this particular example, the aforementioned spelling of the names represent the preferred spellings of the company names as indicated by a validation rules for column 710-2 that requires the resulting best records 730 to include a non-empty entry selected from a list of preferred company names for column 710-2. Each or columns 710-3 through 710-8 may also be bound with associated validation rules. Accordingly, when the best record creation rules 720 are applied to the matched and harmonized records 701 to produce the resulting best records 730, the validation rules for each column may be applied to determine whether any of the resulting columns 710 fail or violate corresponding validation rules. Assuming the simplest case, in which all columns 710 are associated with or are bound to validation rules that require non-empty entries, then it is evident that best record 730-1 has no failed columns, best record 730-2 has two failed columns, and best record 730-3 also has two failed columns. According to various embodiments of the present disclosure, the computing system may then generate a corresponding confidence scores for each of the resulting best records 730. Best record 730-1 may have a confidence score of 100%, best record 730-2 and 730-3 may both associated with a confidence score of 80.1%. Using the confidence scores for each one of the individual resulting best records 730, the computing system may also generate a score by which to evaluate the existing best record creation rules 720. For example, if the average confidence score for a batch of resulting best records 730 falls below a particular threshold value, then the computing system may generate a flag indicating that the existing best record creation rules 720 may need to be reviewed and edited to increase their efficacy. Similarly, the computing system may monitor the number of resulting best records with confidence scores that fall below a particular threshold value as the best record creation rules 720 are applied. If, over some period of time or as some number of matched and harmonized records are processed, the number of resulting best records with confidence scores below a threshold value exceeds a predetermined number, then the computer system may also indicate that the best record creation rules 720 need to be reevaluated and possibly edited to increase the efficacy.

Figure 8:
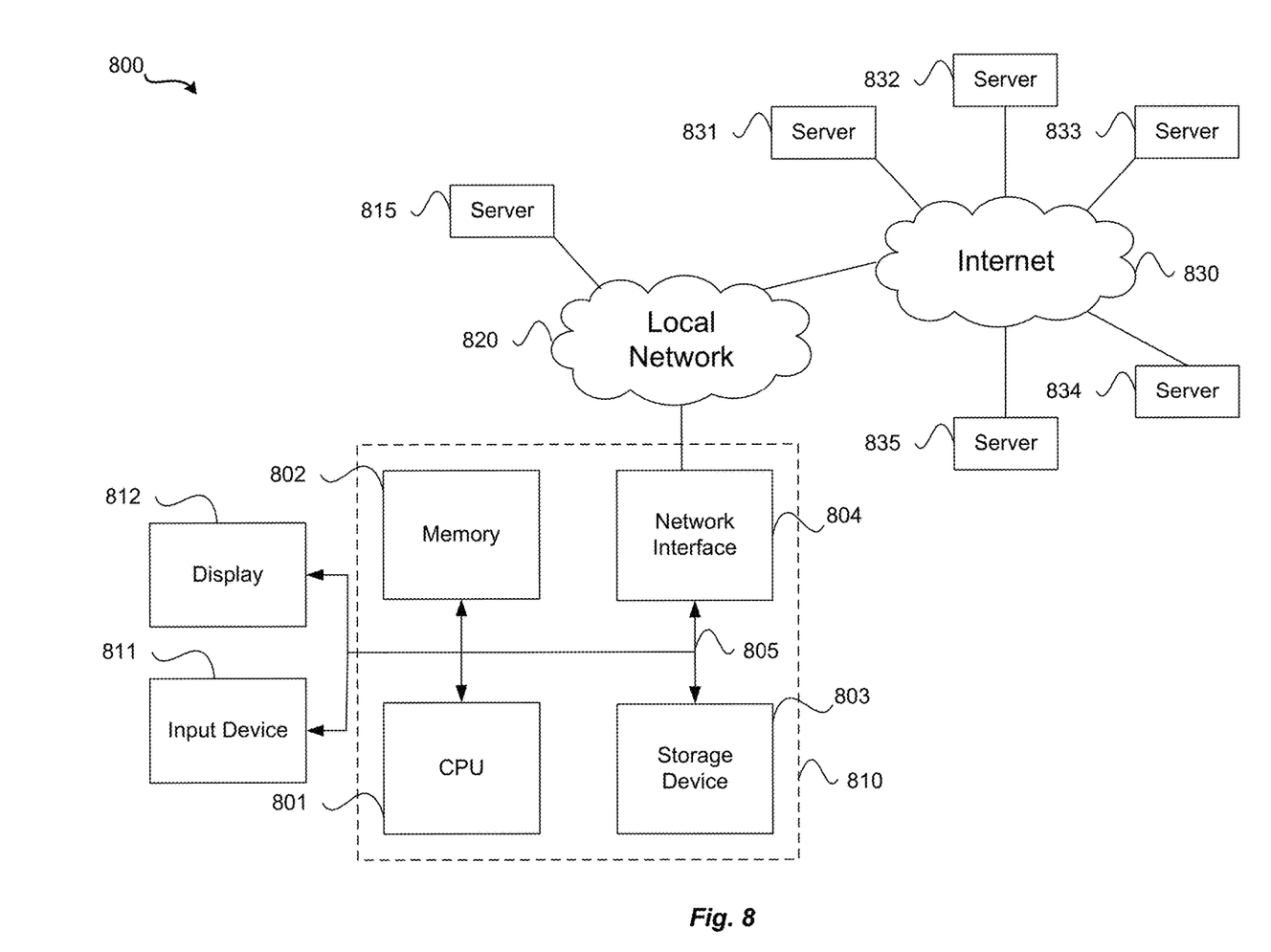
FIG. 8 illustrates a schematic of an example computer system that can be used to implement various embodiments of the present disclosure.

FIG. 8 illustrates an example computer system and networks that may be used to implement one embodiment of the present disclosure. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 810 may be coupled via the same or different information bus, such as bus 805, to a display 812, such as a cathode ray tube (CRT), touchscreen, or liquid crystal display (LCD), for displaying information. An input device 811 such as a keyboard and/or mouse is coupled to a bus for communicating information and command selections from the user to processor 801. The combination of these components allows the user to communicate with the system.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831 across the network. Software components described above may be implemented on one or more servers. A server 831 may transmit messages from one component, through Internet 830, local network 820, and network interface 804 to a component or container on computer system 810, for example. Software components of a composite application may be implemented on the same system as other components, or on a different machine than other software components. This process of sending and receiving information between software components or one or more containers may be applied to communication between computer system 810 and any of the servers 831 to 835 in either direction. It may also be applied to communication between any two servers 831 to 835.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, by a computer system, a best record strategy for creating best record data comprising a plurality of data fields, the best record strategy defining a first best record creation rule specifying a first data source for a first data field in the plurality of data fields and a second best record creation rule specifying a second data source for a second data field in the plurality of data fields;
   generating, by the computer system, the first best record creation rule and the second best record creation rule based on the best record strategy, wherein the first best record creation rule specifies the first data source for the first data field in the plurality of data fields of the best record data and the second best record creation rule specifies the second data source for the second data field in the plurality of data fields of the best record data;
   receiving, by the computer system, a first plurality of record data from the first and second data sources, wherein the first plurality of record data comprises a first record data from the first data source and a second record data from the second data source;
   storing the first plurality of record data in a first database;
   creating, by the computer system, the best record data by retrieving the first plurality of record data from the first database and applying the first and second best record creation rules to the first plurality of record data in order to populate the first data field of the best record data with a data field of the first record data and populate the second data field of the best record data with a data field of the second record data; and
   storing the best record data in a second database different from the first database.

2. The method of claim 1, wherein the first best record creation rule is associated with a validation rule, the method further comprising:
   determining, in the computer system, whether the first data field of the best record data satisfies the validation rule; and
   generating, in the computer system, a confidence score for best record data based on the determination, wherein the confidence score describes the quality of the best record data.

3. The method of claim 2, wherein the confidence score is based on a number of data fields within the plurality of data fields of the best record data that fail validation rules associated with the plurality of best record creation rules.

4. The method of claim 2, further comprising:
   comparing, in the computer system, the confidence score against a threshold value; and
   revising, in the computer system, at least one best record creation rule from the plurality of best record creation rules in response to the comparison.

5. The method of claim 1 further comprising:
   receiving, by the computer system, a second plurality of record data from the first and second data sources;
   applying, by the computer system, the first and second best record creation rules to the second plurality of record data to generate a subset of the second plurality of record data; and
   receiving, by the computer system, user input comprising edits to at least some of the subset of the second plurality of record data.

6. The method of claim 5 further comprising applying, in the computer system, the first and second best record creation rules to the user input to verify compliance with the best record strategy.

7. The method of claim 6 further comprising applying, in the computer system, edits to the at least some of the subset of the second plurality of record data to the best record data.

8. A non-transitory computer readable medium comprising instructions, that when executed by a computer processor cause the computer processor to be configured for:
   receiving a best record strategy for creating best record data comprising a plurality of data fields, the best record strategy defining a first best record creation rule specifying a first data source for a first data field in the plurality of data fields and a second best record creation rule specifying a second data source for a second data field in the plurality of data fields;
   generating the first best record creation rule and the second best record creation rule based on the best record strategy, wherein the first best record creation rule specifies the first data source for the first data field in the plurality of data fields of the best record data and the second best record creation rule specifies the second data source for the second data field in the plurality of data fields of the best record data;
   receiving a first plurality of record data from the first and second data sources, wherein the first plurality of record data comprises a first record data from the first data source and a second record data is from the second data source;
   storing the first plurality of record data in a first database;

creating the best record data by retrieving the first plurality of record data from the first database and applying the first and second best record creation rules to the first plurality of record data in order to populate the first data field of the best record data with a data field of the first record data and populate the second data field of the best record data with a data field of the second record data; and storing the best record data in a second database different from the first database.

9. The non-transitory computer readable medium of claim 8 wherein the instructions further cause the computer processor to be configured for:

receiving a second plurality of record data from the first and second data sources;

applying the first and second best record creation rules to the second plurality of record data to generate a subset of the second plurality of record data; and receiving user input comprising edits to at least some of the subset of the second plurality of record data.

10. The non-transitory computer readable medium of claim 9 wherein the instructions further cause the computer processor to be configured for applying the first and second best record creation rules to the user input to verify compliance with the best record strategy.

11. The non-transitory computer readable medium of claim 10 wherein the instructions further cause the computer processor to be configured for applying edits to the at least some of the subset of the second plurality of record data to the best record data.

12. The non-transitory computer readable medium of claim 8, wherein the first best record creation rule is associated with a validation rule, the method further comprising:

determining whether the first data field of the best record data satisfies the validation rule; and generating a confidence score for best record data based on the determination, wherein the confidence score describes the quality of the best record data.

13. The non-transitory computer readable medium of claim 12, wherein the confidence score is based on a number of data fields within the plurality of data fields of the best record data that fail validation rules associated with the plurality of best record creation rules.

14. The non-transitory computer readable medium of claim 12, further comprising:

comparing the confidence score against a threshold value; and revising at least one best record creation rule from the plurality of best record creation rules in response to the comparison.

15. A system comprising:

a computer processor;

a non-transitory computer readable medium coupled to the processor and comprising instructions, that when executed by the computer processor cause the computer processor to be configured to:

receive a best record strategy for creating best record data comprising a plurality of data fields, the best record strategy defining a first best record creation rule specifying a first data source for a first data field in the plurality of data fields and a second best record creation rule specifying a second data source for a second data field in the plurality of data fields;

generate a first and a second best record creation rules based on the best record strategy, wherein the first best record creation rule specifies the first data source for the first data field in the plurality of data fields of the best record data and the second best record creation rules specifies the second data source for the second data field in the plurality of data fields of the best record data;

receive a first plurality of record data from the first and second data sources, wherein the first plurality of record data comprises a first record data from the first data source and a second record data from the second data source;

store the first plurality of record data in a first database;

create the best record data by accessing the first plurality of record data from the first database and applying the first and second best record creation rules to the first plurality of record data in order to populate the first data field of the best record data with a data field of the first record data and populate the second data field of the best record data with a data field of the second record data; and store the best record data in a second database different from the first database.

16. The system of claim 15 wherein the instructions further cause the computer processor to be configured to:

receive a second plurality of record data from the first and second data sources;

apply the first and second best record creation rules to the second plurality of record data to generate a subset of the second plurality of record data; and receive user input comprising edits to at least some of the subset of the second plurality of record data.

17. The system of claim 16 wherein the instructions further cause the computer processor to be configured to:

apply the first and second best record creation rules to the user input to verify compliance with the best record strategy; and apply edits to the at least some of the subset of the second plurality of record data to the best record data.

18. The system of claim 15, wherein the first best record creation rule is associated with a validation rule, wherein the instructions further cause the computer processor to be configured to:

determine whether the first data field of the best record data satisfies the validation rule; and generate a confidence score for best record data based on the determination, wherein the confidence score describes the quality of the best record data.

19. The system of claim 18, wherein the confidence score is based on a number of data fields within the plurality of data fields of the best record data that fail validation rules associated with the plurality of best record creation rules.

20. The system of claim 18, wherein the instructions further cause the computer processor to be configured to:

compare the confidence score against a threshold value; and revise at least one best record creation rule from the plurality of best record creation rules in response to the comparison.

* * * * *